US009619539B2

(12) United States Patent
Sayed et al.

(10) Patent No.: US 9,619,539 B2
(45) Date of Patent: Apr. 11, 2017

(54) AUTOMATED DOCUMENT REPLICATION IN A DISTRIBUTED COMPUTING SYSTEM

(71) Applicant: VMware,Inc., Palo Alto, CA (US)

(72) Inventors: Imran Q Sayed, Mountain View, CA (US); Jayesh Seshadri, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 547 days.

(21) Appl. No.: 13/630,353

(22) Filed: Sep. 28, 2012

(65) Prior Publication Data

US 2014/0095435 A1  Apr. 3, 2014

(51) Int. Cl.
G06F 17/30 (2006.01)
G06F 3/06 (2006.01)

(52) U.S. Cl.
CPC ........ G06F 17/30575 (2013.01); G06F 3/065 (2013.01)

(58) Field of Classification Search
CPC .................... G06F 17/30575; G06F 3/065
USPC ................................. 707/624, 610
See application file for complete search history.

(56) References Cited

U.S. PATENT DOCUMENTS

| 5,440,727 A * | 8/1995 | Bhide | G06F 17/30368 |
| | | | 707/999.01 |
| 5,588,147 A * | 12/1996 | Neeman | G06F 17/30212 |
| 5,832,514 A * | 11/1998 | Norin | G06F 17/30215 |
| 5,933,593 A * | 8/1999 | Arun | G06F 11/1451 |
| | | | 711/126 |
| 5,996,088 A * | 11/1999 | Frank | G06F 11/1451 |
| | | | 714/6.12 |
| 6,070,191 A | 5/2000 | Narendran et al. | |
| 6,125,371 A * | 9/2000 | Bohannon | G06F 17/30309 |
| | | | 707/695 |
| 6,167,438 A * | 12/2000 | Yates | G06F 17/30902 |
| | | | 707/E17.12 |
| 6,195,680 B1 * | 2/2001 | Goldszmidt | H04L 12/56 |
| | | | 709/203 |
| 6,289,424 B1 * | 9/2001 | Stevens | G06F 9/5016 |
| | | | 711/147 |

(Continued)

FOREIGN PATENT DOCUMENTS

CN   101689182 A   3/2010
CN   101918927 A   12/2010

(Continued)

OTHER PUBLICATIONS

International Searching Authority, International Search Report and Written Opinion, PCT/US2013/057384, Dec. 17, 2013, 9 pages.

(Continued)

Primary Examiner — Shahid Alam
Assistant Examiner — Nargis Sultana

(57) ABSTRACT

In a method of automated document replication in a distributed computing system, a document at a first node of a distributed computing system is analyzed. Based on the analysis, it is determined whether the document has a multi-node affinity. In response to determining that the document has a multi-node affinity, at least one document is automatically replicated between nodes of the distributed computing system. The indicated nodes are indicated based on context of the multi-node affinity of the analyzed document.

6 Claims, 7 Drawing Sheets

(56) References Cited

U.S. PATENT DOCUMENTS

| | | | |
|---|---|---|---|
| 6,424,992 B2* | 7/2002 | Devarakonda | H04L 67/1008 370/237 |
| 7,065,537 B2* | 6/2006 | Cha | G06F 11/1471 707/648 |
| 7,231,494 B1* | 6/2007 | Cox | G06F 17/30902 707/E17.12 |
| 7,305,421 B2* | 12/2007 | Cha | G06F 11/1471 |
| 7,587,429 B2* | 9/2009 | Liedes | G06F 11/1471 |
| 7,739,240 B2* | 6/2010 | Saito | G06F 11/1435 707/634 |
| 7,831,735 B1* | 11/2010 | Kabra | G06F 17/30165 707/624 |
| 8,046,467 B2* | 10/2011 | Petter | G06F 9/5061 709/226 |
| 8,090,717 B1 | 1/2012 | Bharat et al. | |
| 2005/0235016 A1* | 10/2005 | Amano | G06F 11/1435 |
| 2006/0161530 A1* | 7/2006 | Biswal | G06F 17/30356 |
| 2007/0043728 A1* | 2/2007 | Chan | G06F 11/2033 |
| 2007/0291294 A1* | 12/2007 | Suzuki | G06F 3/1206 358/1.13 |
| 2007/0294319 A1* | 12/2007 | Mankad | G06F 11/1662 |
| 2008/0016091 A1* | 1/2008 | Chandra | G06F 17/30884 |
| 2008/0126430 A1* | 5/2008 | Garrett | G06F 17/30377 |
| 2008/0222111 A1* | 9/2008 | Hoang | G06F 17/30289 |
| 2008/0270490 A1* | 10/2008 | Watterott | G06F 17/30557 |
| 2009/0157666 A1* | 6/2009 | Gehrke | G06F 17/30864 |
| 2010/0198888 A1* | 8/2010 | Blomstedt | G06F 17/30017 707/827 |
| 2011/0055332 A1* | 3/2011 | Stein | G06F 17/30675 709/206 |
| 2011/0246519 A1* | 10/2011 | Jansen | G06F 17/30545 707/770 |
| 2012/0226685 A1 | 9/2012 | Agapiev | |
| 2012/0233176 A1* | 9/2012 | Korn | G06F 21/6227 707/747 |

FOREIGN PATENT DOCUMENTS

| | | |
|---|---|---|
| CN | 101999113 A | 3/2011 |
| JP | 10031670 A | 2/1998 |
| JP | 2008-171336 A | 7/2008 |
| KR | 10-2012-0009800 A | 2/2012 |
| WO | 2009144688 A2 | 12/2009 |
| WO | 2009144688 A3 | 1/2010 |

OTHER PUBLICATIONS

International Searching Authority, Supplementary European Search Report, PCT/US2013057384, Apr. 1, 2016, 7 pages.
Chinese Application No. 201380040173X, 1st Office Action, Dated Dec. 14, 2016, 8 pgs.
Search Report, Chinese Application No. 201380040173X, Dated Nov. 30, 2016, 3 pgs.

* cited by examiner

AUTOMATED DOCUMENT REPLICATION IN A DISTRIBUTED COMPUTING SYSTEM

BACKGROUND

Some examples of modern distributed computing systems include net servers and larger enterprise systems. These and other distributed computing systems often involve databases that contain bundles of data, which can be thought of and referred to as "documents," and which may be queried and manipulated such as with a structured query language. A computational "node," in one example of a distributed computing system, may be defined as including the virtual machines and hosts in a single cluster. In this manner, it can be seen that a node of a distributed computing system often has its resources co-located, such as at a single datacenter.

The number of documents in a typical distributed computing system can often be very large. For efficiency purposes, scalability purposes, fault tolerance/redundancy purposes, policy purposes, and/or other purposes, documents of a distributed computing system are often replicated and stored across multiple computational nodes of the distributed computing system in a logical resource pool which can be accessed by any node. Thus, while a document may not be stored locally at a node, it may be stored at another node which is part of the logical resource pool. Document replication often occurs as a result of scaling, attempts to improve efficiency, or attempts to improve fault tolerance/redundancy.

For example, if electricity costs are cheaper at a datacenter which runs on hydroelectric power, many documents may be replicated on a node of this datacenter in order to take advantage of this efficiency of operating in a low cost power environment. If a first node is located at a datacenter in an earthquake prone region, many or all documents stored at that first node may be replicated at other nodes which are located in regions not prone to earthquakes, this provides both redundancy and fault tolerance. Additionally, when a distributed computing system is scaled up in hardware size the overall amount of documents may be allocated among all the nodes in a manner which balances the load experienced by the distributed computing system. In some instances, documents may be replicated at multiple nodes of a distributed computing system in order to simply maintain some redundancy. In some instances, a data replication policy may dictate that all documents are required to be replicated at a second location that is a certain distance (e.g., 500 miles) away from where a document is initially stored. It should also be noted that when data is replicated within a node or on multiple nodes, it can help improve a user experience by reducing latency and better facilitating access by multiple users.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description of the drawings should not be understood as being drawn to scale unless specifically noted.

DESCRIPTION OF EMBODIMENTS

Figure 1:
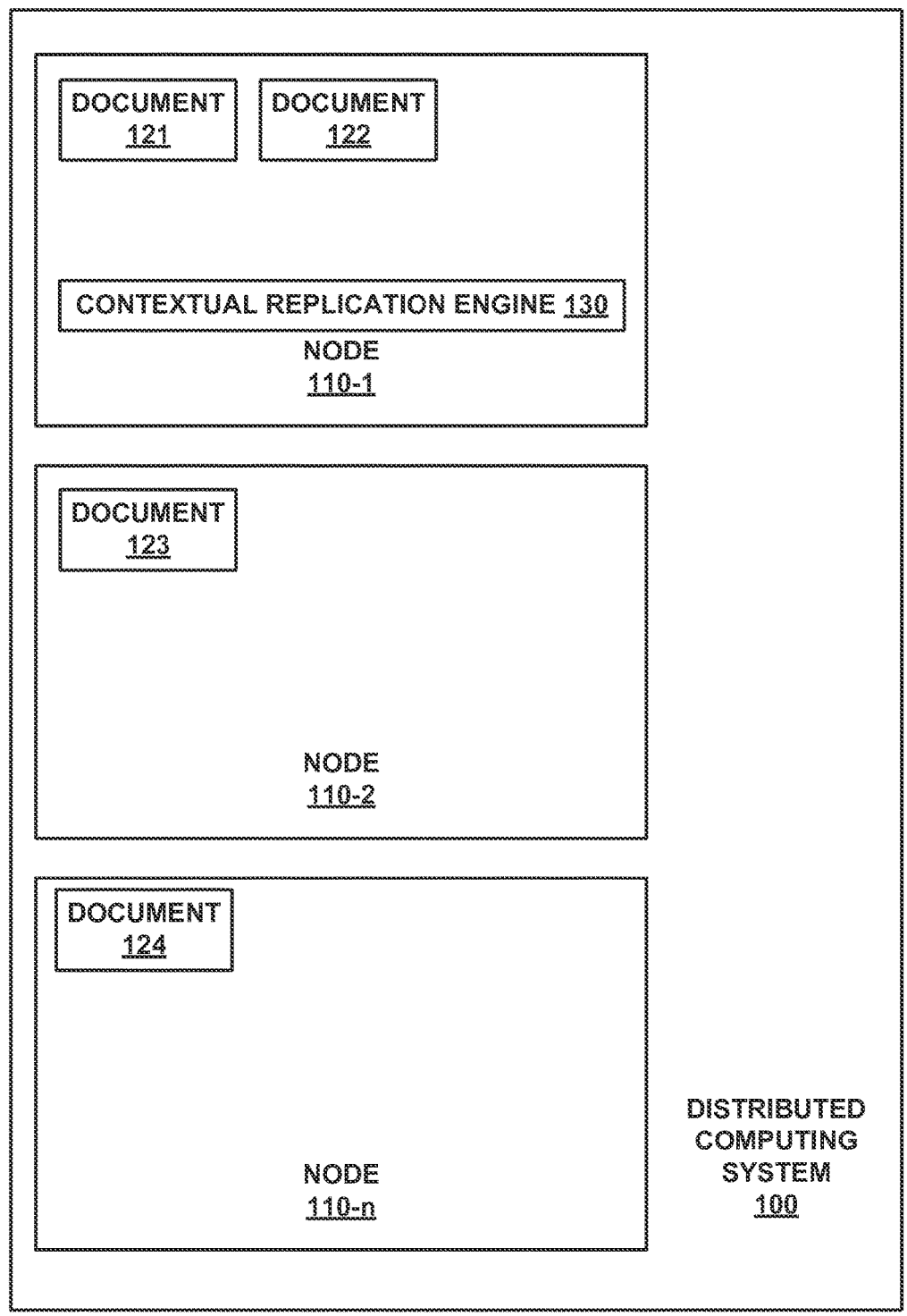
FIG. 1 is an example block diagram of a distributed computing system that includes a contextual replication engine, in accordance with embodiments.

Reference will now be made in detail to various embodiments, examples of which are illustrated in the accompanying drawings. While various embodiments are discussed herein, it will be understood that they are not intended to be limiting. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding. However, embodiments may be practiced without one or more of these specific details. In other instances, well known methods, procedures, components, and circuits have not been described in detail as not to unnecessarily obscure aspects of the described embodiments.

Notation and Nomenclature

Unless specifically stated otherwise as apparent from the following discussions, it is appreciated that throughout the present Description of Embodiments, discussions utilizing terms such as "analyzing," "determining," "replicating," or the like, often refer to the actions and processes of an electronic computing device or system, such as a virtual machine, among others, of a distributed computing system. The electronic computing device/system transmits, receives, stores, manipulates and/or transforms signals represented as physical (electrical) quantities within the circuits, components, logic, and the like, of the electronic computing device/system into other signals similarly represented as physical electrical quantities within the electronic computing device/system or within or transmitted to other electronic computing devices/systems.

Overview of Discussion

As previously described in the background, conventional replication of documents between nodes in a distributed computing system occurs, principally, as a result of operations involved with scaling, preventing bottlenecks, and improving user experience. These are all valid operations and goals, but it can be seen that according to such conventional techniques, the actual decision of which document to replicate and where to replicate it is an artifact of making the overall data of the distributed computing system highly available, highly distributed, or low latency. That is, conventionally, decisions of which document to replicate and where to replicate it within a distributed computing system are made outside of the structure of the documents being replicated. As described herein, a "document" may be any type of file object that can be stored, linked, and replicated. One non-limiting example of a document is a record stored in a table of a database.

Herein various systems, methods and techniques for automated document replication in a distributed computing system are described which utilize contextual information of a document to determine if the document or some other document should be replicated at another node of a distributed computing system, and if so at which node the replication should occur.

Discussion begins with a description of an example distributed computing system that includes multiple nodes and a contextual replication engine. Operation of various components of the distributed computing system and the contextual replication engine is then described. Some examples of document replication between nodes of the distributed computing system are described. Operation of various components of the contextual replication engine is further described in conjunction with description of various methods of automated document replication in a distributed computing system.

Example Distributed Computing System

FIG. 1 is an example block diagram of a distributed computing system 100 that includes a contextual replication engine 130, in accordance with embodiments. As depicted in FIG. 1, distributed computing system 100 includes a plurality of nodes represented by nodes 110-1, 110-2, and 110-n. Although three nodes 110 are depicted and described herein, it should be understood that a distributed computing system 100 may include a plurality of two nodes 110 or of more than three nodes 110. A node, such as any one of nodes 110, may defined in numerous manners, however, in one embodiment, a node 110 includes the virtual machines and hosts in a single cluster. In this manner, it can be seen that a node 110 of distributed computing system 100 may often have all or nearly all of its resources co-located, such as at a single data center. The plurality of nodes 110 may be located in a single datacenter or facility, but more often different nodes 110 of a distributed computing system are remote from one another. For example, in one embodiment, node 110-1 may be located at a datacenter in the United States, while node 110-2 is located at a datacenter in France, and while node 110-n is located at a datacenter in Japan.

While most or all resources for a given node 110 (e.g., 110-1) may be co-located, a node 110 may also utilize a logical storage system that extends across a plurality of nodes and allows documents locates across the plurality of nodes to be accessed by external entities as if they are stored in a single storage device. Thus, while documents 121 and 122 are stored locally at node 110-1, node 110-1 may also access document 123 which is stored locally at node 110-2 and/or access document 124 which is stored locally at node 110-n.

In a structured query language, a "join" is query or programming phrase used to combine documents from two or more in tables or locations in a database. In a distributed computing environment, a database may have its documents and/or tables stored in many locations that are not local to one another. Conventionally, in a situation as described above, where nodes 110-1, 110-2, and 110-n are remote from one another, there is an increased latency in queries and other actions which require joins between documents on different nodes. This is because a document needed for the join which is not locally stored will need to be replicated from a remote node before the query can processed. This replication introduces latency. Likewise, there is less latency for a user request received at node 110-1 for an action involving document 121 than for a user request received at node 110-1 for an action involving document 123. This is because, typically, document 123 will need to be replicated from node 110-2 to node 110-1 so that node 110-1 can process the user request involving document 123; while no such replication needs to occur with respect to document 121 as it is already present locally at node 110-1.

As depicted in FIG. 1, node 110-1 includes contextual replication engine 130. Contextual replication engine 130 operates to replicate documents between nodes 110 based on document context. The context utilized may include references to other documents which exist in a given document, such as document 121, and/or may include context determined from metadata associated with the given document. Thus, instead of document replication being an artifact of other goals, the data of or associated with a document dictates which documents are replicated and where they are replicated.

Although depicted as being located at node 110-1, it should be appreciated that contextual replication engine 130 may exist anywhere within distributed computing system 100 where it can be communicatively coupled with logical storage of documents of nodes 110 in distributed computing system 100. It should also be appreciated that, in some embodiments, contextual replication engine 130 is implemented on a plurality of the nodes 110 in distributed computing system 100. In some embodiments, one or more aspects of contextual replication engine 130 may be implemented as a virtual machine.

Example Contextual Replication Engine

Figure 2:
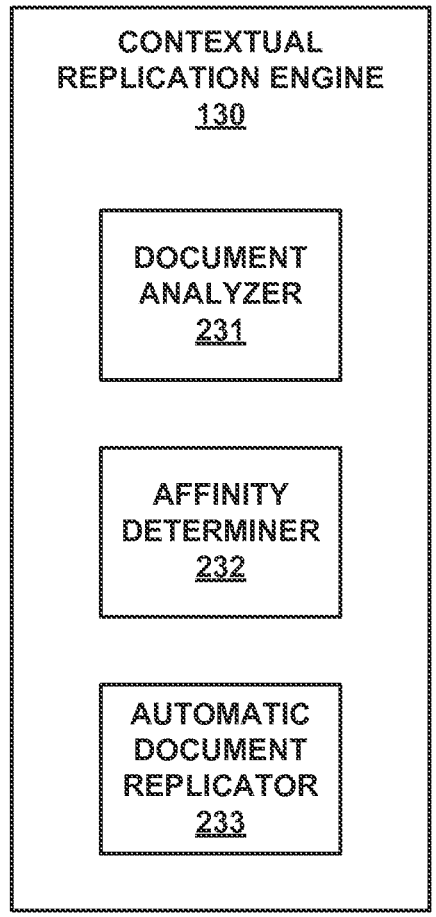
FIG. 2 is an expanded block diagram of the contextual replication engine of FIG. 1, in accordance with an embodiment.

FIG. 2 is an expanded block diagram of contextual replication engine 130 of FIG. 1, in accordance with various embodiments. As depicted, contextual replication engine 130 includes a document analyzer 231, an affinity determiner 232, and an automatic document replicator 233. Contextual replication engine 130 may be employed in a layered approach with one or more conventional techniques that result in document replication between nodes. That is, a layered approach may be employed where contextual replication engine 130 performs contextual replication of documents either before or after (or both before and after) the employment of one or more conventional techniques which result in document replication between nodes of a distributed processing system.

Document analyzer 231 analyzes a document, such as document 121 of distributed computing system 100, for context which can be used to guide document replication. This can comprise analyzing the data content of a document for references to other documents and then determining if the referenced documents are stored locally at the same node as the analyzed document, or else are stored on a different node from the node at which the analyzed document is stored. In one example, such references are annotated by pointers or links that explicitly define or indicate a relationship between one document and another document. One non-limiting example of such a link is the presence of an XLink in XML (eXtensible Markup Language) within an analyzed document. Such an XLink may be formatted, in one embodiment, in accordance with the formatting recommendations of the World Wide Web Consortium.

Additionally or alternatively, in some embodiments, document analyzer 231 analyzes metadata associated with a document to determine if there is a high likelihood that the document will be accessed at another node external to the node at which is stored. Some non-limiting examples of what metadata may be analyzed include a record of previous nodes from which the document has been accessed, human languages utilized within document, locations of domains referred to in the document (e.g., locations of domains of email addresses or websites), and geographic locations mentioned in the document. For example, if a document was previously accessed through a node such as node 110-2 that is located in France, it may be considered that there is a likelihood that the document will again be accessed from this node. Similarly, if a document includes references to domains located in Japan and extensive use of Japanese email addresses it may be considered, in one embodiment, that this combination of metadata cues constitutes a likelihood that the document will be accessed from a node, such as node 110-n, located in Japan. It should be noted that such analysis of metadata of a document to determine other nodes from which the document may be accessed, in some embodiments, bears many similarities to techniques utilized to parse a document for determining the types of advertisements which are viable to serve to a user/viewer of a document.

An analyzed document may be an existing document that has been previously stored or published to a node 110, or a document that is newly received and published to a node 110. In this manner, contextual replication engine 130 may be employed as part of a bootstrap process when a node 110 is initially stood up, may be employed with respect to all new documents that are published to a node 110 after a certain time, or may be employed to assist in rebalancing of one or more existing nodes 110 in a distributed computing system.

Affinity determiner 232 operates to determine whether an analyzed document has single node affinity or multi-node affinity. For example, based on analysis performed by document analyzer 231, affinity determiner 232 would determine that an analyzed document had single node affinity if it did not reference any documents stored at other nodes external to the node at which it was stored and/or had no demonstrated likelihood of being accessed through another node other than the node at which the analyzed document was stored. Affinity determiner 232 would determine that an analyzed document had multi-node affinity if analysis of the document revealed links to documents stored at other nodes external to the node at which the annualized document was stored and/or had demonstrated likelihood of being accessed through another node other than the node at which the analyzed document was stored. Various gradations of likelihood of access from an external node to where a document is stored may be employed by a document analyzer 231 in some embodiments. For example terms low and high may be based on preset parameters such as a certain threshold number of metadata cues being found to exist. Such gradations and thresholds may also be user-definable or adjustable. In embodiments which employ such gradations, multi-node affinity may be determined when a particular level of gradation is found to exist.

In one embodiment, a metadata cue may be based on a time frequency of access of a particular document. For example, a metrics indicating when and how often a document is accessed may be stored in metadata of a document or of storage location where a document is stored. If such metrics indicate that a document has been accessed recently or multiple times within a certain time period, a time-frequency of access cue may be present which increases the document affinity score or level of gradation. Consider an example where a human resources document located in Japan stores employee information for employees based in Japan, and this Japanese human resources document is often joined with documents from the company's intellectual property docketing system in France and the company's social media application in the United States. Further, consider that the social media application access the Japanese human resources document much more frequently than the intellectual property docketing system. In one embodiment, the time frequency of access related metadata cues derived from metadata associated with the human resources document may surpass a threshold that such that multi-node affinity determiner 232 determines the human resources document to have multi-node affinity with a node in the United States which is used by the social media application, but does not meet the threshold for having multi-node affinity with a node in France which is used by the intellectual property docketing system.

Automatic document replicator 233 operates to automatically replicate at least one document between nodes of the distributed computing system. The replication occurs in response to a determination that an analyzed document has multi-node affinity. The indication(s) are based on context of the multi-node affinity of the analyzed document. Replication actions performed by automatic document replicator 233 are based on the indication(s). In some embodiments, automatic document replicator 233 operates in concert with existing replication infrastructure of distributed computing system 100, rather than duplicating such infrastructure, by directing the existing replication infrastructure regarding which document(s) to replicate and where to perform the replication. It is appreciated that, in some embodiments, automatic document replicator 233 operates as a low priority component of distributed computing system 100. That is, it may operate in the background or operate utilizing idle computing resources.

In one embodiment, automatic document replicator 233 operates to replicate an analyzed document at any node from which analysis of the document suggests that there is a requisite likelihood that the document will be accessed and at which the document is not presently stored. In one embodiment, automatic document replicator 233 additionally or alternatively operates to replicate locally, to the node at which the analyzed document is stored, any document that is referenced by the analyzed document but not already stored at the same node as the analyzed document. In one embodiment, automatic document replicator 233 additionally or alternatively operates to replicate an analyzed document at any node where a document referenced in the analyzed document is stored.

Some non-liming examples of the operation of contextual replication engine 130 are described with reference to FIGS. 3-5.

Figure 3:
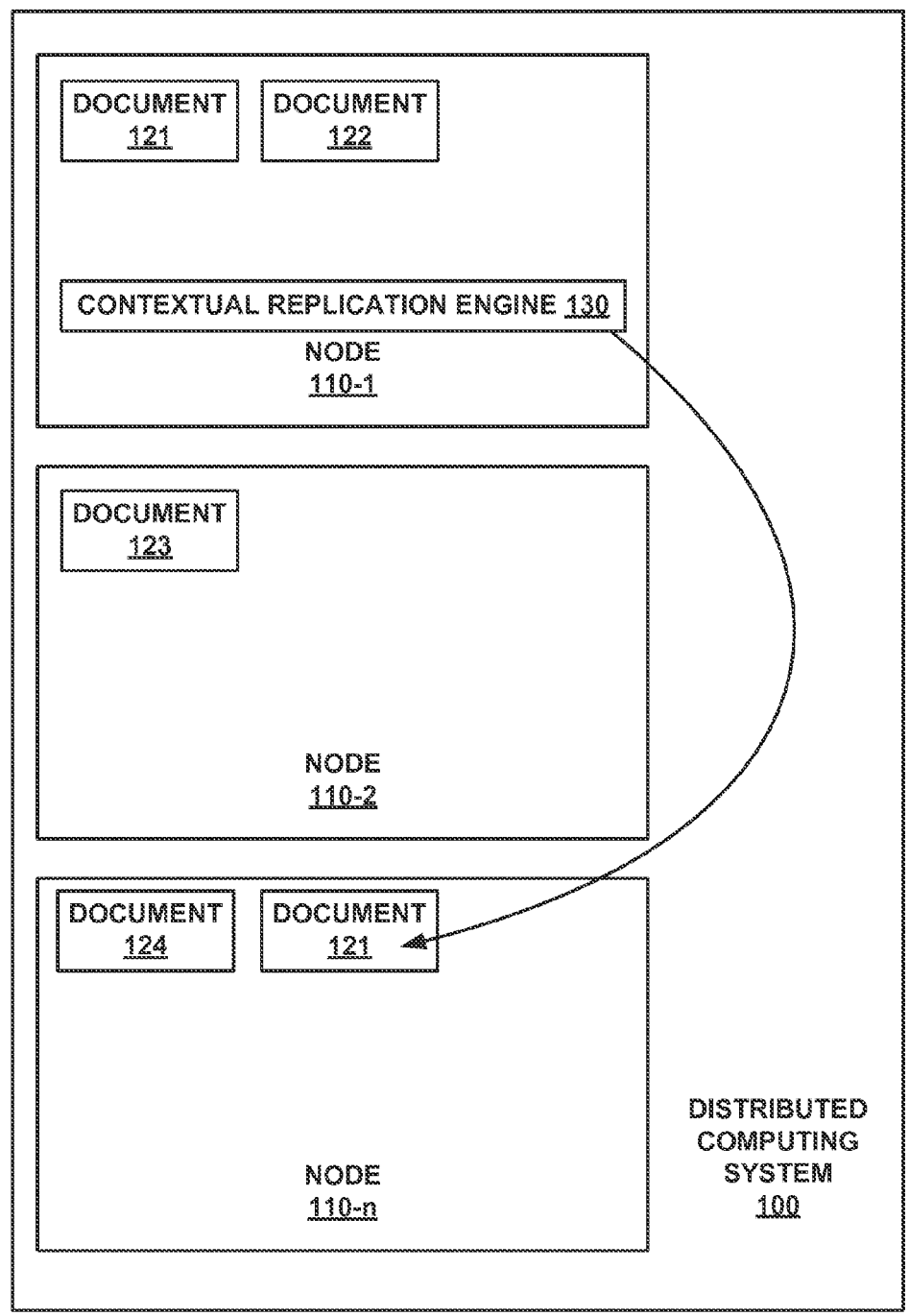
FIG. 3 is block diagram of the distributed computing system of FIG. 1 illustrating an example of document replication, in accordance with various embodiments.

FIG. 3 is block diagram of distributed computing system 100 of FIG. 1 and illustrates an example of document replication, in accordance with various embodiments. With reference to FIGS. 1 and 3, consider an example wherein node 110-1 is located in North America and node 110-n is located in Japan. If, in such an example, analysis reveals that document 121 is highly likely to be accessed from Japan (based on presence of several Japanese email addresses, a dot-corn domain located Japan, and previous access of document 121), then in one embodiment automatic document replicator 233 replicates document 121 on a node, such as node 110-n, which is located in Japan or closer to Japan that node 110-1. This reduces latency in the event that document 121 is accessed through node 110-n.

Figure 4:
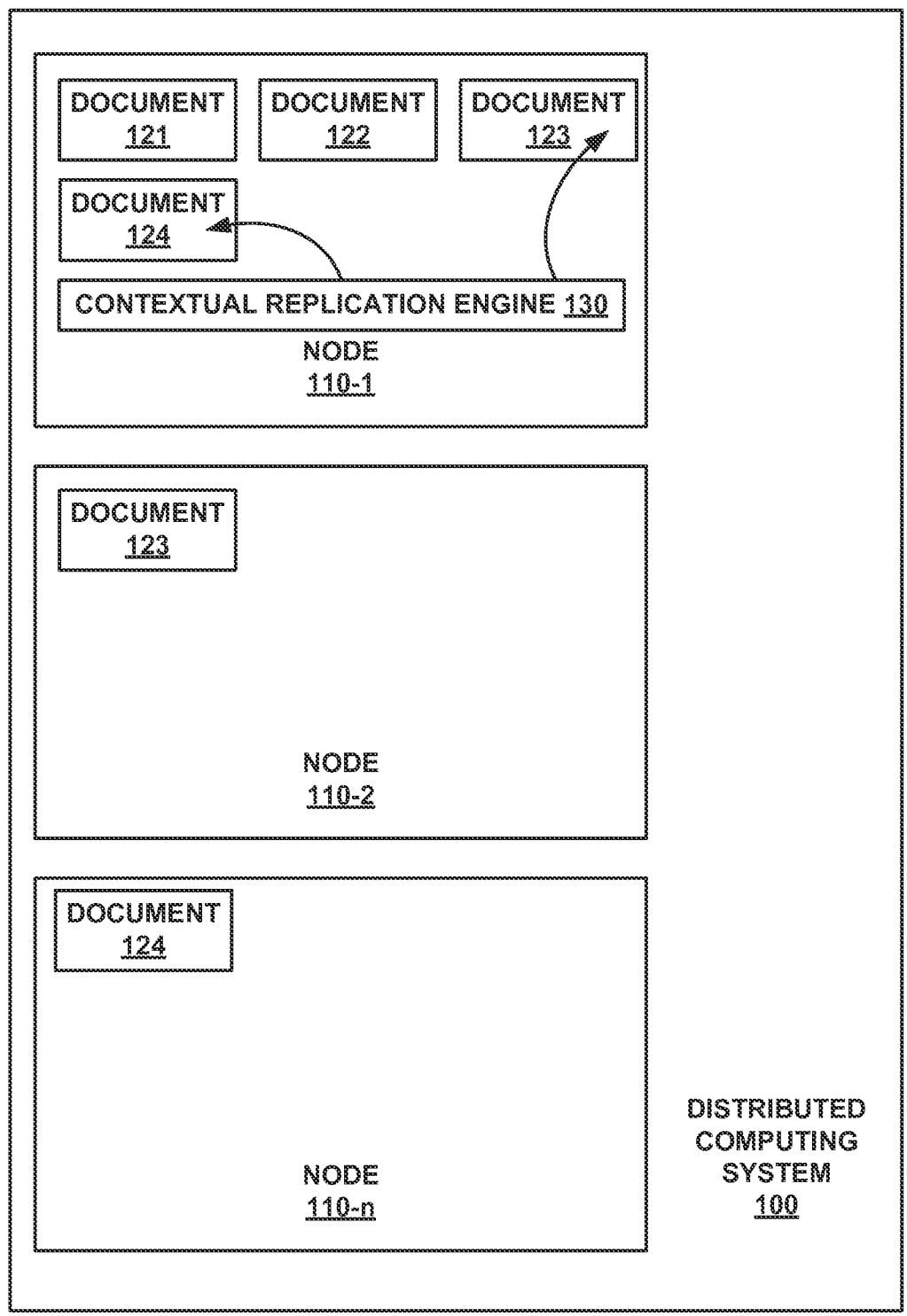
FIG. 4 is block diagram of the distributed computing system of FIG. 1 illustrating an example of document replication, in accordance with various embodiments.

FIG. 4 is block diagram of distributed computing system 100 of FIG. 1 and illustrates an example of document replication, in accordance with various embodiments. With reference to FIGS. 1 and 4, consider an example wherein node 110-1 includes document 121 stored locally at node 110-1. In one such an example, analysis reveals that document 121 references documents 122, 123, and 124. As can be seen from FIG. 1, document 122 already exists locally at node 110-1. However, documents 123 and 124 only exist on nodes 110-2 and 110-n respectively. In such an embodiment, automatic document replicator 233 replicates document 123 locally at node 110-1 and also replicates document 124 locally at node 110-1 to facilitate local query processing of any joins of one of these referenced documents to document 121. In this manner, a query to node 110-1 involving document 121 will decrease latency associated with joining either or both of documents 123 and 124 with document 121 in response to the query. This is because documents 123 and 124 are already stored locally at node 110-1 and will not have to be replicated locally at the time of, and in response to, the query.

Figure 5:
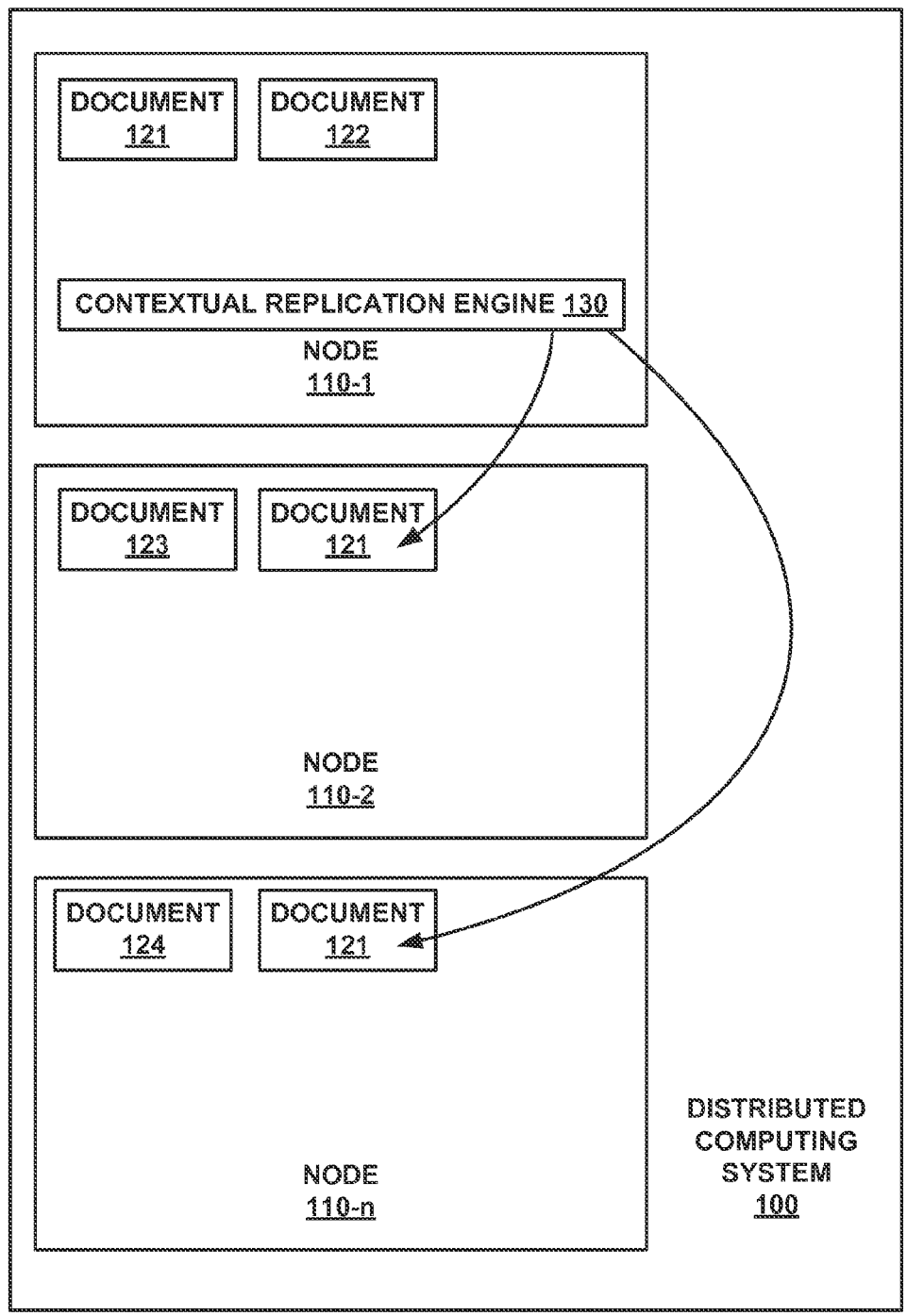
FIG. 5 is block diagram of the distributed computing system of FIG. 1 illustrating an example of document replication, in accordance with various embodiments.

FIG. 5 is block diagram of distributed computing system 100 of FIG. 1 and illustrates an example of document replication, in accordance with various embodiments. With reference to FIGS. 1 and 5, consider an example wherein node 110-1 includes document 121 stored locally at node 110-1. In one such an example, analysis reveals that document 121 references documents 123 and 124. As can be seen from FIG. 1, documents 123 and 124 exist on nodes 110-2 and 110-n respectively. In such an embodiment, automatic document replicator 233 may replicate document 121 at node 110-2 and also replicate document 121 on node 110-n to facilitate local query processing of joins to document 121 that result from queries to nodes 110-2 and 110-n. In this manner a query to node 110-2 involving document 121 will have decreased latency associated with joining document 121 with document 123 in response to the query; likewise, a query to node 110-n involving document 121 will have decreased latency associated with joining document 121 with document 124 in response to the query. This is because document 121 is now co-located at nodes with documents that it reference and will not have to be replicated locally at either node 110-2 or 110-n at the time of, and in response to, a query. In some embodiments, contextual replication engine 130 also replicates document 124 on node 110-2 and replicates document 123 on node 110-n to fully facilitate local query processing of any joins to document 121 that result from queries to nodes 110-2 and 110-n. As references in a document are typically one-way references rather than two-way references, replication according to these techniques described in conjunction with FIG. 5 may be employed less frequently that the replication techniques described by the examples associated with FIGS. 3 and 4.

It is appreciated that replication described in any of these three example illustrated in FIGS. 2-5, may be combined in various ways. As one illustration of such combination, the document replications described in examples associated with FIGS. 4 and 5 may be combined such that documents 123 and 124 are replicated locally at node 110-1 while document 121 is also replicated at each of nodes 110-2 and 110-n. Likewise the replication described by the examples associated with FIGS. 3 and 4 may be combined in a situation where analysis of metadata associated with document 121 indicates that it is likely to be accessed from node 110-n and analysis of references in document 121 indicate reference to documents 123 and 124. In such a situation, document 121 would be replicated at node 110-n while documents 123 and 124 would be replicated at node 110-1.

As previously described, documents of a distributed computing system are often replicated and stored across multiple computational nodes of a distributed computing system which can be accessed by any node. Such existing document replication may occur for one or more of a variety of reasons including, but not limited to: efficiency purposes, scalability purposes, fault tolerance/redundancy purposes, policy purposes, and/or other purposes. The automated document replication described herein, in various embodiments, operates in conjunction with such existing document replication in a cooperative manner. For example, if a document is required to be replicated for fault redundancy purposes or because a policy dictates that the document must be replicated at a second location at least X number of miles from a first location where the document is stored, one or both of these policies may be satisfied by replicating the document in the manner described herein such that it is stored at a location near a document that references it or that it references. Likewise, document replication in the manner described herein may satisfy requirements for efficiency, scalability, and/or fault tolerance that are not greatly concerned with where a document is replicated but more with, or only with, the fact that it is stored at more than a single location. In should thus be appreciated, that document replication in the manner described herein, may in many instances be carried out in cooperation with existing reasons for document replication without adding to replication overhead, storage needs, time spent, or cost. Likewise, it should be appreciated that document replication in the manner described herein may allow multiple replication goals to be met at once, for example, redundancy may be satisfied while simultaneously, and at no additional cost, maximizing a reduction in search latency.

Example Methods of Operation

Figure 6:
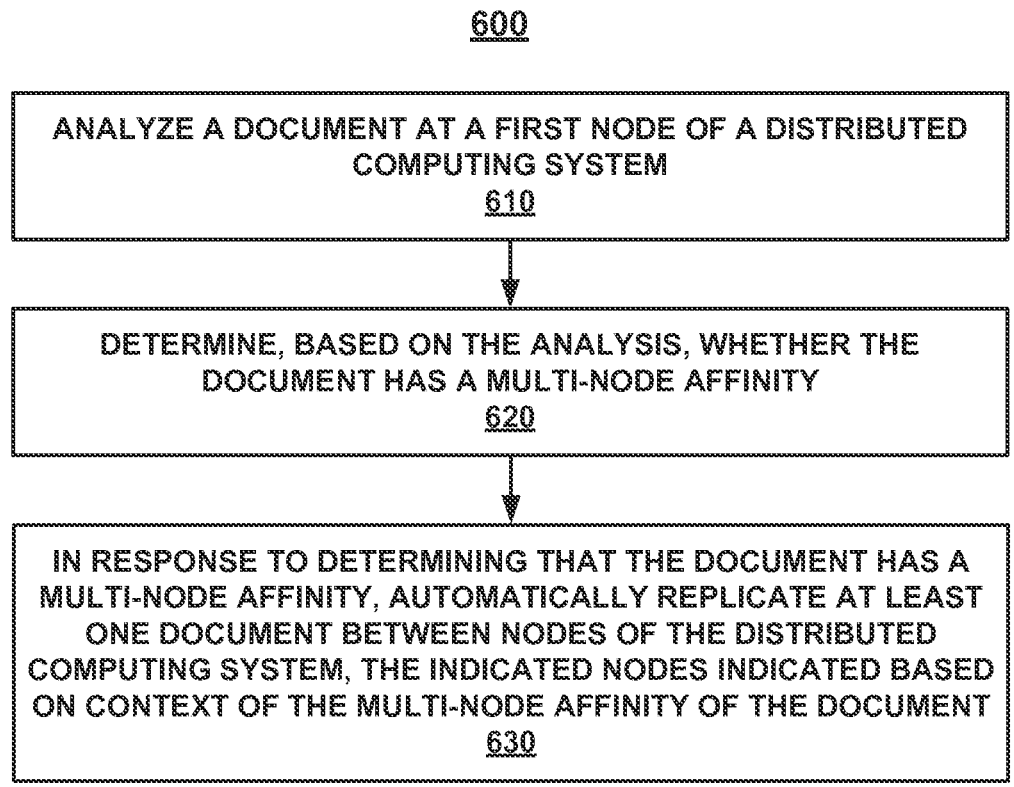
FIG. 6 is a flow diagram of a method of automated document replication in a distributed computing system, in accordance with various embodiments.
Figure 7:
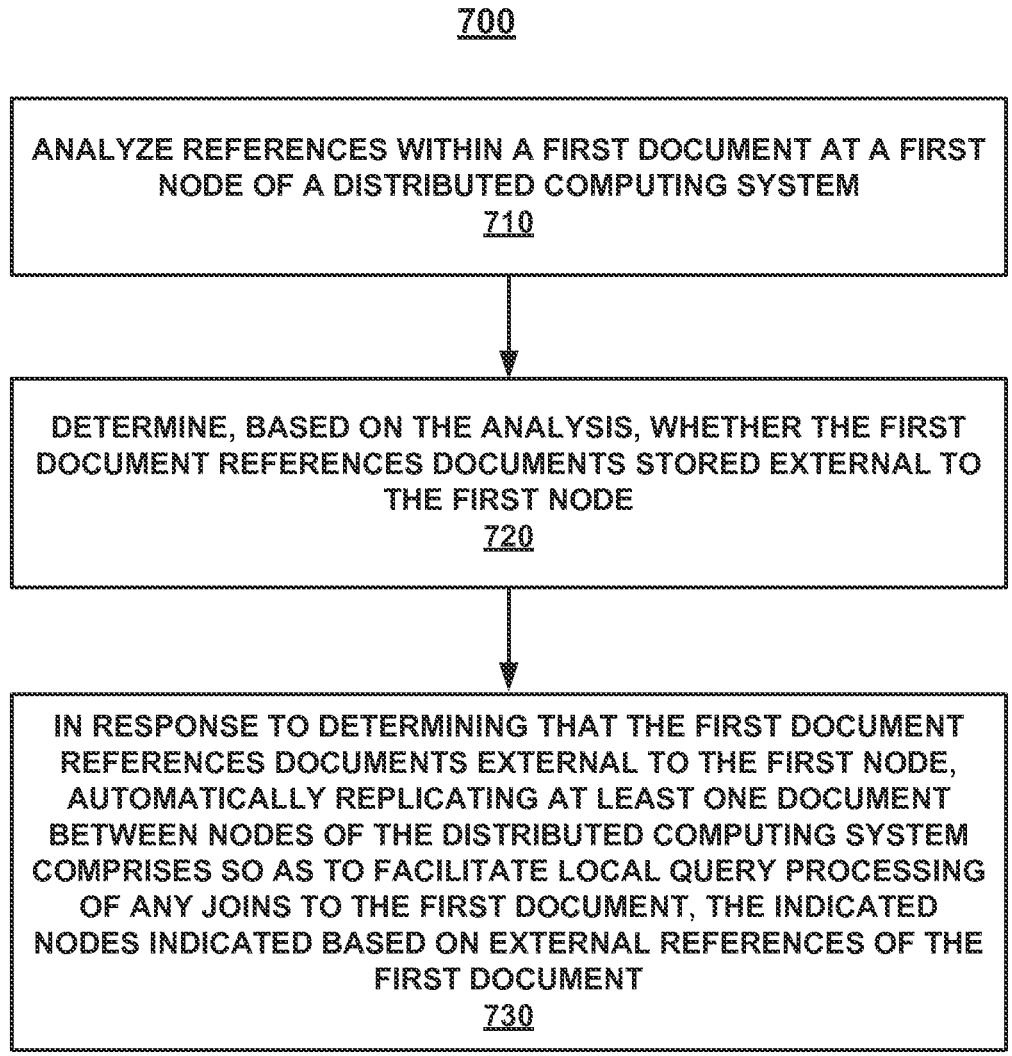
FIG. 7 is a flow diagram of a second method of automated document replication in a distributed computing system, in accordance with various embodiments.

The following discussion sets forth in detail the operation of some example methods of operation of embodiments. With reference to FIGS. 6 and 7, flow diagram 600 and 700 illustrate example procedures used by various embodiments. Flow diagrams 600 and 700 include some procedures that, in various embodiments, are carried out by a processor under the control of computer-readable and computer-executable instructions. In this fashion, procedures described herein and in conjunction with flow diagrams 600 and/or 700 are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, solid state drives/"disks," and optical disks, any or all of which may be employed with distributed computing system 100. The computer-readable and computer-executable instructions, which reside on tangible computer readable storage media, are used to control or operate in conjunction with, for example, one or some combination of processors of distributed computing system 100. It is appreciated that the processor(s) may be physical or virtual or some combination (it should also be appreciated that a virtual processor is implemented on physical hardware). Although specific procedures are disclosed in flow diagrams 600 and 700, such procedures are examples. That is, embodiments are well suited to performing various other procedures or variations of the procedures recited in flow diagram 600 and/or 700. Likewise, in some embodiments, the procedures in flow diagrams 600 and/or 700 may be performed in an order different than presented and/or not all of the procedures described in one or more of these flow diagrams may be performed. It is further appreciated that procedures described in flow diagram 600 and/or 700 may be implemented in hardware, or a combination of hardware with firmware and/or software.

FIG. 6 is a flow diagram 600 of a method of automated document replication in a distributed computing system such as distributed computing system 100, in accordance with various embodiments.

At procedure 610 of flow diagram 600, in one embodiment, a document is analyzed at a first node of a distributed computing system. In one embodiment, this comprises document analyzer 231 of contextual replication engine 130 performing this analysis in the manner previously described herein. For example, with reference to FIG. 1, in some embodiments, document analyzer 231 analyzes a document, such as document 121, by parsing it for references to documents stored at other nodes 110 of distributed computing system 100 other than the node on which the analyzed document is locally stored. A non-limiting example of a reference includes a link to another document which would require the linked document to be joined with the analyzed document in response to a database query of the analyzed document. In some embodiments, document analyzer 231 analyzes metadata associated with a document, such as document 121, to determine additional nodes of distributed computing system 100, other than the node on which the analyzed document is locally stored, via which the analyzed document is likely to be accessed. Some non-limiting examples of metadata which may be analyzed include previous access history of a document and information mentioned in a documents which may provide access context (e.g., email addresses mentioned, internet domains mentioned, languages utilized, and geographic locations mentioned).

At procedure 620 of flow diagram 600, in one embodiment, based on the analysis performed at 610, it is determined whether the analyzed document has a multi-node affinity. In one embodiment, affinity determiner 232 makes a determination as to whether an analyzed document has affinity for a single node or for multiple nodes. For example, if an analyzed document, such as document 121, is discovered to reference documents such as document 123 and 124 which are only stored non-locally with respect to node 110-1, then document 121 is determined to have multi-node affinity. However, if no references exist in document 121 or only a reference to a locally stored document, such as document 122, exists; then in one embodiment, document 121 may be determined to have single node affinity. In one embodiment, affinity determiner 232 additionally or alternatively determines affinity based on associated metadata of document 121. If metadata cues to likely access via another node accumulate past a threshold (which may be preset or user modified), then affinity determiner 232 determines that an analyzed document is a multi-node document. For example, in one embodiment if a document contains four cues which suggest likely access from France (e.g., a French email address, use of French language, reference to a company located in France, and some recent previous access by an intellectual property docketing system in France), then affinity determiner 232 determines that it is likely that a an analyzed document, such as document 121, will be accessed from via a node in France (e.g., accessed via node 110-2), even though the document has been published to node 110-1. Even if the document includes no references to documents located on other nodes, affinity determiner may determine based on metadata that the analyzed document is has multi-node affinity. Similarly, if the threshold for such a metadata based multi-node affinity determination is, for example, four cues, and if only three cues are noted, affinity determiner 232 would not determine that a multi-node affinity existed based on analysis of metadata. For example, in one such embodiment, four or more cues would cause affinity determiner 232 to determine that the document has a high multi-node affinity and should be replicated, while three or fewer cues would cause affinity determiner 232 to determine that document has a low multi-node affinity and does not replication for affinity purposes.

At procedure 630 of flow diagram 600, in one embodiment, in response to determining that the analyzed document has multi-node affinity, at least one document is automatically replicated between indicated nodes of the distributed computing system. In one embodiment, the indication(s) about which node(s) to perform the replication between is/are based on context of the multi-node affinity of the document. Automatic document replicator 233 performs the replication(s) based on the indication(s). For example, the context may indicate that multi-node affinity is based on the analyzed document referencing one or more documents stored externally on another node(s), and thus automatic document replicator 233 automatically replicates any externally referenced document(s) at the node where the analyzed document is stored. Based on the same context, in one embodiment, automatic document replicator 233 additionally or alternatively replicates the analyzed document on one or more other nodes, other than the node where the analyzed document is already stored, which store documents that are referenced in the analyzed document.

In another embodiment, the context may indicate that the multi-node affinity is based on a likely external node of access (external to the node where the analyzed document is locally stored). In such a situation, automatic document replicator 233 automatically replicates the analyzed document to any node via which it has been deemed by metadata analysis as likely to be accessed.

In another embodiment, the context may indicate that the multi-node affinity is based on a combination of characteristics. For example context may indicate that multi-node affinity of the analyzed document is based on both a likely external node of access (external to the node where the analyzed document is locally stored) and an external document reference. In one such situation, automatic document replicator 233 automatically replicates that externally referenced document locally to the node where the analyzed document is stored and also replicates the analyzed document to any node via which it has been deemed by metadata analysis as likely to be accessed.

In some embodiments, after a first document at a first node is processed in the manner described in procedures 610-620, one or more additional documents at the first node or at other nodes within distributed computing system 100 are similarly processed.

FIG. 7 is a flow diagram 700 of a method of automated document replication in a distributed computing system such as distributed computing system 100, in accordance with various embodiments.

At 710 of flow diagram 700, in one embodiment, a document is analyzed at a first node of a distributed computing system. In one embodiment, this comprises document analyzer 231 of contextual replication engine 130 performing this analysis in the manner previously described herein. For example, in one embodiment, document analyzer 231 analyzes a document, such as document 121, by parsing it for references to documents stored at other nodes 110 of distributed computing system 100, other than node the node on which the analyzed document is locally stored. A non-limiting example of a reference includes a link to another document which would require the linked document to be joined with the analyzed document in response to a database query of the analyzed document. It is appreciated that such analysis of a document can be performed upon initial storage or publication of the document at the first node or at after the document has been stored or published to the first node. Thus, such analysis may be part of bootstrapping a node, rebalancing a node or an entire distributed computing system, and/or as part of a policy put in place to begin with new documents stored at the node after a certain point in time.

At 720 of flow diagram 700, in one embodiment, based on the analysis, it is determined whether the first document references documents stored external to the first node. In one embodiment, affinity determiner 232 makes a determination as to whether an analyzed document is external to the node on which the analyzed document is stored. For example, with reference to FIG. 1, if an analyzed document, such as document 121, is discovered to reference documents such as document 123 and 124 which are only stored non-locally with respect to node 110-1, then document 121 is determined In have multi-node affinity and to reference documents stored external to node 110-1. However, consider an embodiment where references exist within an analyzed document, such as document 121, or only a reference to a locally stored document, such as document 122, exists. In one such embodiment, document 121 may be determined to have single node affinity as no documents external to node 110-1 are referenced.

At 730 of flow diagram 700, in one embodiment, in response to determining that the first document references documents external to the first node, at least one document is automatically replicated between indicated nodes of distributed computing system 100 so as to facilitate local query processing of any joins to the first document. The node(s) at which replication is performed is/are indicated by based on external references of (within) the first document. Replication at any indicated nodes is performed by contextual replication engine 130.

In one embodiment, contextual replication engine 130 automatically replicates, at the first node, all documents referenced by the first document which are not already stored locally at the first node. With reference to FIG. 1, if document 121 is the analyzed first document and it externally references documents 123 and 124, then in one embodiment (as illustrated in FIG. 4) contextual replication engine 130 replicates document 123 at node 110-1 and also replicates document 124 at node 110-1.

In another embodiment, contextual replication engine 130 automatically replicates the first document at all nodes, other than the first node, where documents referenced in the first document are replicated. For example, with reference to FIG. 1, if document 121 is the analyzed first document and it externally references documents 123 and 124, then in one embodiment (as illustrated in FIG. 5) contextual replication engine 130 replicates document 121 at nodes 110-2 and 110-n.

In some embodiments, after a first document at a first node is processed in the manner described in procedures 710-730, one or more additional documents at the first node or at other nodes within distributed computing system 100 are similarly processed.

Example embodiments of the subject matter are thus described. Although various embodiments of the have been described in a language specific to structural features and/or methodological acts, it is to be understood that the appended claims are not necessarily limited to the specific features or acts described above. Rather, the specific features and acts described above are disclosed as example forms of implementing the claims and their equivalents.

What is claimed is:

1. A method of automated document replication in a distributed computing system, said method comprising:
    analyzing, by a processor, references within data content of a first document at a first node of a distributed computing system;
    determining, based on said analysis, whether said first document references documents stored external to said first node; and
    in response to determining that said first document references documents external to said first node, automatically replicating at least one document between indicated nodes of said distributed computing system so as to facilitate local query processing of any joins to said first document, said indicated nodes indicated based on external references of said first document.

2. The method as recited in claim 1, wherein said analyzing references within a first document at a first node of a distributed computing system comprises: analyzing said first document upon initial storage at said first node.

3. The method as recited in claim 1, wherein said analyzing references within a first document at a first node of a distributed computing system comprises:
    analyzing said first document as a part of a rebalancing of said distributed computing system.

4. The method as recited in claim 1, wherein said analyzing references within a first document at a first node of a distributed computing system comprises:
    analyzing said first document as part of a bootstrapping of said first node.

5. The method as recited in claim 1, wherein said automatically replicating at least one document between indicated nodes of said distributed computing system so as to facilitate local query processing of any joins to said first document comprises:
    automatically replicating, at said first node, all documents referenced by said first document which are not already stored at said first node.

6. The method as recited in claim 1, wherein said automatically replicating at least one document between indicated nodes of said distributed computing system so as to facilitate local query processing of any joins to said first document comprises:
    automatically replicating said first document on nodes, other than said first node, where documents referenced in said first document are located.

* * * * *